United States Patent [19]
VanPutte

[11] Patent Number: 5,429,874
[45] Date of Patent: Jul. 4, 1995

[54] WATER SOLUBLE FILM

[75] Inventor: Andrew VanPutte, Greenville, S.C.

[73] Assignee: W. R. Grace & Co.-Conn., Duncan, S.C.

[21] Appl. No.: 944,730

[22] Filed: Sep. 14, 1992

Related U.S. Application Data

[63] Continuation of Ser. No. 700,014, May 14, 1991, abandoned.

[51] Int. Cl.⁶ .................................................. B32B 1/08
[52] U.S. Cl. ................................. 428/522; 428/411.1; 428/520; 428/35.2; 428/35.4; 428/36.7
[58] Field of Search ............... 428/35.4, 220, 34.3, 428/35.2, 36.1, 36.7, 520, 522, 483, 514, 411.1; 524/424, 423, 401, 503; 252/90, 94

[56] References Cited

U.S. PATENT DOCUMENTS

| | | | |
|---|---|---|---|
| 3,546,716 | 12/1970 | Laumann | 4/112 |
| 3,661,695 | 5/1972 | Berliner | 161/151 |
| 3,790,067 | 2/1974 | Scheier | 229/55 |
| 3,892,905 | 7/1975 | Albert | 428/220 |
| 4,288,497 | 9/1981 | Tanaka et al. | 428/447 |
| 4,289,830 | 9/1981 | Knott, II | 428/475.8 |
| 4,372,311 | 3/1983 | Potts | 128/287 |
| 4,410,441 | 10/1983 | Davies et al. | 206/0.5 |
| 4,481,262 | 11/1984 | Shida et al. | 428/441 |
| 4,503,098 | 3/1985 | Potts | 427/394 |
| 4,551,369 | 11/1985 | Belz | 428/36 |
| 4,612,355 | 9/1986 | Belz | 526/65 |
| 4,620,999 | 11/1986 | Holmes | 206/524.3 |
| 4,654,395 | 3/1987 | Schulz et al. | 526/318.42 |
| 4,672,956 | 6/1987 | Potter et al. | 128/90 |
| 4,692,494 | 9/1987 | Sonenstein | 525/57 |
| 4,762,738 | 8/1988 | Keyes et al. | 428/34.3 |
| 4,772,663 | 9/1988 | Marten et al. | 525/60 |
| 4,806,261 | 2/1989 | Ciallella et al. | 252/90 |
| 4,828,744 | 5/1989 | Kaufmann et al. | 252/90 |
| 4,851,472 | 7/1989 | Famili et al. | 525/60 |
| 4,868,024 | 9/1989 | Cross et al. | 428/35.2 |
| 4,870,148 | 9/1989 | Belz et al. | 526/318 |
| 4,884,828 | 7/1989 | Aoki | 252/90 |
| 4,930,942 | 6/1990 | Keyes et al. | 406/49 |
| 4,948,857 | 8/1990 | Marten et al. | 526/329 |
| 4,973,416 | 11/1990 | Kennedy | 252/90 |
| 4,990,146 | 2/1991 | Deibig et al. | 604/332 |

(List continued on next page.)

FOREIGN PATENT DOCUMENTS

| | | |
|---|---|---|
| 0142950 | 5/1985 | European Pat. Off. . |
| 0226439 | 12/1986 | European Pat. Off. . |
| 0226439 | 6/1987 | European Pat. Off. . |
| 0284191 | 9/1988 | European Pat. Off. . |
| 0337568 | 10/1989 | European Pat. Off. . |
| 0407301A1 | 1/1991 | European Pat. Off. . |
| 0457600 | 11/1991 | European Pat. Off. . |
| 513692 | 11/1992 | European Pat. Off. . |
| 0060644 | 3/1987 | Japan . |
| 02060906A | 3/1990 | Japan . |
| 108534 | 4/1990 | Japan . |
| 02108534A | 4/1990 | Japan . |

(List continued on next page.)

OTHER PUBLICATIONS

Plastics with a Built in Belland 1989.
Vinol Polyvinyl Alcohols Air Products 1980.
Vinex Thermoplastic Air Products 1988.
Polyox Water-Soluble Resins Union Carbide 1967.
Novel Thermoplastic Polyv COEX '88 191–199.
Vinol Polyvinyl Alcohol Air Products.
Water Soluble Films Aquafilm.

Primary Examiner—Charles R. Nold
Assistant Examiner—Michael A. Williamson
Attorney, Agent, or Firm—Mark B. Quatt

[57] ABSTRACT

A water soluble film suitable for packaging caustic chemicals has an outer layer of a water soluble polymeric material, and an inner layer of a polymeric material which is compatible with the contents of a package made from the film. An intermediate layer can optionally be included to contribute to the tensile strength, bulk, or abuse resistance, or some other property of the film. Water soluble fillers such as salt can optionally be added to one or more of the polymeric materials, prior to or during extrusion of the film, to improve the processability of the film or its rate of dissolution in water, or to add a pigment to the film.

6 Claims, 1 Drawing Sheet

| U.S. PATENT DOCUMENTS | | | |
|---|---|---|---|
| 5,073,455 | 12/1991 | Nose et al. | 428/411.1 |
| 5,078,301 | 1/1992 | Gladfelter et al. | 222/52 |
| 5,108,382 | 4/1992 | Wright et al. | 604/342 |
| 5,181,966 | 1/1993 | Honeycutt et al. | 134/42 |
| 5,234,615 | 8/1993 | Gladfelter et al. | 252/90 |
| 5,362,532 | 11/1994 | Famili et al. | 428/36.6 |

| FOREIGN PATENT DOCUMENTS | | |
|---|---|---|
| 02155999 | 6/1990 | Japan . |
| 02163149A | 6/1990 | Japan . |
| 3124734 | 5/1991 | Japan . |
| 1384791 | 2/1973 | United Kingdom . |
| 2083762 | 2/1985 | United Kingdom . |
| 92/01037 | 1/1992 | WIPO . |

WATER SOLUBLE FILM

This application is a continuation of application Ser. No. 700,014 filed on May 14, 1991, now abandoned.

BACKGROUND OF THE INVENTION

The present invention relates to polymeric film, and more particularly to water soluble film suitable for packaging caustic materials.

Caustic or potentially hazardous materials such as detergents, soaps, pesticides and fertilizers are currently typically packaged in dispensers, such as high density polyethylene bottles, or other containers. After the chemical contents have been used, the dispenser or container must be disposed of in an environmentally safe way. This can be technically difficult and expensive.

Another concern with the use of such caustic or otherwise hazardous chemicals or pesticides is the safety of the user. In installing, using, and disposing of dispensers or containers containing such hazardous chemicals, the safety of the user can be jeopardized if the dispensing or storage system is not properly handled.

It is the object of the present invention to provide a convenient, effective way of storing caustic or potentially hazardous chemicals, pesticides and the like in a manner which satisfies both environmental and safety concerns.

The present invention provides a multilayer film which can effectively and efficiently store a quantity of a chemical, including caustic chemicals, and avoid the need of the end user to open a container to create access to the chemical material.

SUMMARY OF THE INVENTION

In one aspect of the invention, a water soluble film comprises an outer layer comprising a material selected from fully hydrolyzed polyvinyl alcohol, partially hydrolyzed polyvinyl alcohol, and polyethylene oxide; an intermediate layer comprising a material selected from fully hydrolyzed polyvinyl alcohol, partially hydrolyzed polyvinyl alcohol, and polyethylene oxide; and an inner layer comprising a material selected from acid/acrylate copolymer, styrene maleic anhydride copolymer, ethylene acrylic acid copolymer, ionomer, cellulose, hydroxy propyl cellulose, polyether block amide copolymer, polyhydroxy butyric acid, polyhydroxy valeric acid, polyethylene oxide, polyester, copolyester, polyethyloxazoline, polyurethane, partially metal salt neutralized acid/acrylate copolymer, and a blend of acid/acrylate copolymer and ionomer.

In another aspect of the invention, a method for coextruding a packaging film comprises the steps of simultaneously extruding an outer layer comprising a material selected from fully hydrolyzed polyvinyl alcohol, partially hydrolyzed polyvinyl alcohol, and polyethylene oxide, an intermediate layer comprising a material selected from fully hydrolyzed polyvinyl alcohol, partially hydrolyzed polyvinyl alcohol, and polyethylene oxide, and an inner layer comprising a material selected from acid/acrylate copolymer, styrene maleic anhydride copolymer, ethylene acrylic acid copolymer, ionomer, cellulose, hydroxy propyl cellulose, polyether block amide copolymer, polyhydroxy butyric acid, polyhydroxy valeric acid, polyethylene oxide, polyester, copolyester, polyethyloxazoline, polyurethane, partially metal salt neutralized acid/acrylate copolymer, and a blend of acid/acrylate copolymer and ionomer; joining the layers together at an annular coextrusion die; and hot blowing the coextrudate to make the packaging film.

In an alternative method, the materials just described are simutaneously extruded; joined together at a sheet coextrusion die; and cast to make the packaging film.

BRIEF DESCRIPTION OF THE DRAWING

The invention may be further understood with reference to the sole drawing, FIG. 1, showing a cross-section of a film of the present invention.

DESCRIPTION OF THE PREFERRED EMBODIMENTS

Figure 1:
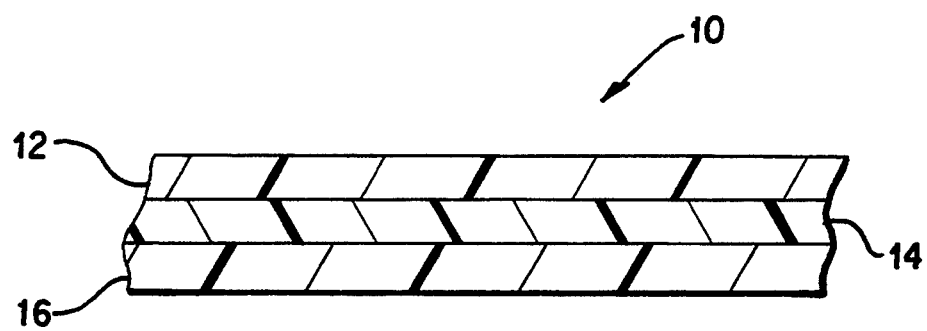

Referring to FIG. 1, a water soluble film 10 includes an outer layer 12 of a water soluble polymeric material.

This outer layer 12 may be a fully hydrolyzed polyvinyl alcohol (PVA) such as Vinex 1003 available from Air Products.

A feature of the fully hydrolyzed PVA of outer layer 12 is that it is insoluble in cold water but increasingly soluble in water at higher temperatures. Typically, at water temperatures above about 120° F. fully hydrolyzed PVA such as the Vinex 1003 resin is fully soluble in water.

Outer layer 12 may also be a low melting point, water soluble coating. By "low melting point" is meant a melting point of between about 120° and 180° F., more preferably between about 130° and 170° F., even more preferably between about 140° and 160° F., and most preferably about 150° F.

Inner layer 16 includes a polymeric material which is compatible with the contents of a package made from the film. Layer 16 normally will be the innermost layer of a package formed from the film and therefore will be in contact with the caustic chemical, pesticide, fertilizer, etc. which is packaged. The term "caustic" is used herein to mean a chemical or mixture of chemicals with a pH of 7.0 or higher, i.e. alkaline.

Layer 16 can be any of a variety of polymeric materials, either polymers, copolymers, terpolymers, etc. which are compatible with the contents of a package formed from the film. By the phrase "compatible with" is meant that the composition of inner layer 16 is such that during normal storage and use, the material of layer 16 will not appreciably decompose or degrade as a result of contact with the package contents. Instead, the material of layer 16 will dissolve when the contents of the container are exposed to water. These contents can include highly caustic chemicals and detergents, pesticides, fertilizers, soaps, and other materials which can aggressively attack some packaging materials.

Suitable materials for layer 16 include acid/acrylate copolymers, preferably methacrylic acid/ethyl acrylate copolymer such as that available from Belland as GBC 2580 and 2600; styrene maleic anhydride copolymer (SMA) (available as Scripset (trademark) from Monsanto); ethylene acrylic acid copolymer (EAA), or metal salt neutralized ethylene methacrylic acid copolymer (EMAA) known as ionomer (available from du Pont), in which the acid content of the EAA or EMAA is at least about 20 mole percent; cellulose; hydroxy propyl cellulose, such as that available from Aqualon as Kluceo (trademark); polyether block amide copolymer; polyhydroxy butyric acid or polyhydroxy valeric acid (available as Biopol (trademark)resins from Imperial Chemical Industries); polyethylene oxide; water soluble polyester or copolyester; polyethyloxazoline (PEOX 200 from Dow); water soluble polyurethane; partially metal salt neutralized acid/acrylate copolymer, and a blend of acid/acrylate copolymer and ionomer.

Non-polymeric materials such as aluminum may be coated or sputtered onto the water-soluble layer 12.

An optional layer 14 can also be advantageously used in the inventive laminate. Intermediate layer 14 includes a polymeric material which contributes to the tensile strength of the overall water soluble film. An especially preferred polymeric material for layer 14 is a partially hydrolyzed PVA such as Vinex 2034 available from Air Products. Preferred partially hydrolyzed PVA materials have a degree of hydrolysis of preferably at least about 60%, and more preferably at least about 70%. Most preferably, such partially hydrolyzed PVA materials are hydrolyzed at between 85 and 98% hydrolysis. Such partially hydrolyzed PVA materials are soluble in both cold and hot water.

An alternative material also suitable for intermediate layer 14 is polyethylene oxide, such as that available from Union Carbide as Poly Ox WSR.

Layer 14 can contribute to the tensile strength of the overall film, but also to such properties as bulk, abuse resistance, and the like.

The invention may be further understood by reference to the following example.

EXAMPLE 1

A fully hydrolyzed polyvinyl alcohol (Vinex 1003) was coextruded with a partially hydrolyzed polyvinyl alcohol (Vinex 2034), and a methacrylic acid/ethyl acrylate copolymer (Belland GBC 2580).

The annular coextrusion die was set at 400° to 410° F. The Vinex 1003 ran at a temperature of about 360° to 400° F. (extrusion temperature). The Vinex 2034 resin ran at a temperature of about 375° to 420° F. The Belland GBC 2580 ran at a temperature of about 320° to 360° F.

The film of Example 1 had a total thickness of about 4.0 mils, with the outer layer of fully hydrolyzed PVA comprising about 1 mil; the intermediate layer of partially hydrolyzed PVA comprising about 2 mils; and the inner contents-compatible layer having a thickness of about 1 mil.

EXAMPLE 2

A film like that of Example 1 is made, but including a water soluble filler in the inner layer.

Although the film of the present invention is preferably carried out by coextrusion techniques well known in the art, resins which are not suitable for coextrusion processes may be brought together by extrusion coating or conventional lamination techniques to produce the final water soluble film. Both discrete layers and coatings can be used for any of the layers of the inventive laminate.

As used herein "water soluble" refers to a film structure which is preferably totally water soluble. However, films which are substantially water soluble but have relatively minor amounts of a material in the film structure which is not water soluble; films with materials which are water soluble only at relatively high water temperatures or only under limited pH conditions; and films which include a relatively thin layer of water insoluble material, are all included in the term "water soluble".

The film of the present invention offers several advantages. The user does not have to open the package and therefore is not exposed to potentially hazardous contents. In addition, the conventional container is not recyclable and therefore can pose a hazard to the environment from residual contents within the container. The present invention offers a water soluble film which can be formed into a biodegradable package which can be used as is, with the appropriate contents within the package, and without the need for attempting to recycle a container.

In some instances, packages can contain premeasured portions so that no measuring is required and the package can be used as is.

Although the water soluble layer 12 of film 10 preferably is soluble only at relatively high water temperatures, other "triggering" mechanisms may be employed. For example, some resin materials may be water soluble at certain ranges of pH. Thus, resins such as the SMA and EAA or EMAA resins can be incorporated into the film structure at relatively low pH conditions, and thereafter formed into a container which is used in a high pH environment where the water soluble layer will decompose.

In instances where a resin is used which is soluble in water at relatively low temperatures, or is soluble in water at a broader range of pH conditions, the film may be protected from accidental failure (i.e. weakening or dissolving by water) by enclosing the package inside an overwrap material. Such overwrap materials in the form of bags, pouches or the like are well known in the art and are typically made up of polyolefin monolayer or multilayer films or laminates. These overwrap materials can also be made from paper, metal, and substances besides synthetic polymers.

In practicing the present invention, two problems can sometimes occur. First, these films can become tacky over time. Second, the rate of dissolution of the film can be slower than desired. These problems can be overcome to some extent by adding a water soluble filler to one or more resins making up the film. This is preferably done by compounding the agent as a powder into the base resin prior to or during extrusion.

Such fillers can solve the tackiness problem by acting as an antiblock, which reduces blocking and improves processing and converting operations.

Such fillers can also dissolve quickly, promoting dispersion of the polymer. This in turn increases the surface area of the material, speeding up dissolution.

When properly selected, these fillers can also function as a pigment.

Water soluble fillers meeting one or more of these properties (antiblock effect, increased dissolution effect, or pigment-bearing) are included in the base resin preferably in a masterbatch or "fully let down" form. The fillers are preferably of sufficiently small particle size for conversion to film. A particle size of about 5 microns or less is preferred.

The water soluble fillers can be compounded into the base resin on conventional compounding equipment such as a twin screw. Stainless steel cooling belts can be used, instead of water, to cool and/or quench the resulting strands. Such belts are commercially available from Sandvik and Berndorf. The compounded resin can then be used in conventional extrusion operations to produce water soluble film.

Suitable water soluble fillers include any material which is water soluble, or substantially so, and capable of being incorporated into the film structures disclosed in this specification. Preferred materials are salts, and more preferably alkali or alkaline earth salts such as sodium carbonate ($Na_2CO_3$); sodium sulfate ($Na_2SO_4$); sodium chloride (NaCl); potassium carbonate ($K_2CO_3$); potassium sulfate ($K_2SO_4$); and potassium chloride (KCl).

One or more of these water soluble fillers can be included in one or more of the layers of the water soluble film of the invention. The filler can be present in any suitable concentration in a given layer. Optimal concentrations will be governed to some extent by the nature of the filler, the nature of the base resin, the specific end use of the film, processing and packaging equipment, and other factors. A preferred concentration of the filler or fillers for a given layer of the film is between about 100 parts per million (0.01%) and 200,000 parts per million (20%) by total weight of the layer.

When using the acid/acrylate copolymer such as the Belland GBC material described above, the inventor has found that these resins process at relatively low temperatures, on the order of 300° F. This temperature is considerably lower than that of many of the resins mentioned above, and which are preferably for use in a multilayer coextruded structure. In addition, the viscosity of these resins is highly temperature dependent. These materials get very fluid at the desired temperatures for coextrusion. The acid/acrylate copolymer also has very low melt strength, and is very tacky and sticky. It is therefore a difficult material to process into a coextruded blown film.

To remedy these deficiencies in the acid/acrylate copolymer, the material is partially neutralized. This can be done by adding a base such as sodium hydroxide to the resin, in a melt reaction. Generally, alkali metal bases, and those having zinc as a metal, are preferred. An alternative is to blend an ionomer, such as commercially available ionomers, with the resin. In either case, an ionically cross-linked material results. It is characterized by more favorable rheology for coextrusion processes; much higher melt strength; less tackiness; better compatibility with the other resins used in the coextrusion process; and little or no adverse effect on the water solubility of the film.

While the present invention has been described with reference to preferred embodiments, those skilled in the art will understand that modifications in resin choice, film structure, and process may be made without departing from the scope of the invention as claimed below.

What is claimed is:

1. A coextruded water soluble multilayer film suitable for packaging caustic materials comprising:
   a) an outer layer comprising a material selected from the group consisting of fully hydrolyzed polyvinyl alcohol, partially hydrolyzed polyvinyl alcohol, and polyethylene oxide;
   b) an intermediate layer comprising a material selected from the group consisting of fully hydrolyzed polyvinyl alcohol, partially hydrolyzed polyvinyl alcohol, and polyethylene oxide; and
   c) an inner layer comprising a material selected from the group consisting of partially metal salt neutralized acid/acrylate copolymer, and a blend of acid/acrylate copolymer and ionomer.

2. The film of claim 1 wherein the film includes a filler in at least one of the layers of the film.

3. The film of claim 2 wherein the filler is a salt.

4. The film of claim 3 wherein the salt is an alkali or alkaline earth salt.

5. The film of claim 3 wherein the salt is selected from the group consisting of sodium carbonate ($Na_2CO_3$); sodium sulfate ($Na_2SO_4$); sodium chloride (NaCl); potassium carbonate ($K_2CO_3$); potassium sulfate ($K_2SO_4$); and potassium chloride (KCl).

6. The film of claim 3 wherein the salt comprises between about 1000 parts per million (0.1%) and 200,000 parts per million (20%) by total weight of at least one of the layers of the film.

* * * * *